(12) United States Patent
Katsura et al.

(10) Patent No.: US 10,788,110 B2
(45) Date of Patent: Sep. 29, 2020

(54) HYBRID DRIVING APPARATUS

(71) Applicant: EXEDY CORPORATION, Neyagawa-shi, Osaka (JP)

(72) Inventors: Hitoshi Katsura, Neyagawa (JP); Kohsuke Murata, Neyagawa (JP); Taichi Kitamura, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 203 days.

(21) Appl. No.: 15/769,123

(22) PCT Filed: Oct. 13, 2016

(86) PCT No.: PCT/JP2016/080396
§ 371 (c)(1),
(2) Date: Apr. 18, 2018

(87) PCT Pub. No.: WO2017/069042
PCT Pub. Date: Apr. 27, 2017

(65) Prior Publication Data
US 2018/0313439 A1    Nov. 1, 2018

(30) Foreign Application Priority Data

Oct. 20, 2015  (JP) .................................. 2015-206491
Sep. 20, 2016  (JP) .................................. 2016-183444

(51) Int. Cl.
*F16H 37/02*     (2006.01)
*B60K 6/365*     (2007.10)
(Continued)

(52) U.S. Cl.
CPC ........... *F16H 37/022* (2013.01); *B60K 6/365* (2013.01); *B60K 6/547* (2013.01); *B60W 20/10* (2013.01);
(Continued)

(58) Field of Classification Search
CPC ....... F16H 37/022; B60K 6/387; B60K 17/08; B60K 17/02; B60K 6/48; B60K 6/365;
(Continued)

(56) References Cited

U.S. PATENT DOCUMENTS 6,269,895 B1    8/2001  Tanuguchi et al.
2003/0078136 A1  4/2003  Yamaguchi et al.
(Continued)

FOREIGN PATENT DOCUMENTS

CN    101595023 A    12/2009
JP    H06-205573 A    7/1994
(Continued)

OTHER PUBLICATIONS

Apr. 24, 2018 International Preliminary Report on Patentability issued in International Patent Application No. PCT/JP2016/080396.
(Continued)

*Primary Examiner* — Patrick H Mackey
(74) *Attorney, Agent, or Firm* — United IP Counselors, LLC

(57) ABSTRACT

A hybrid driving apparatus includes a forward-reverse switching mechanism, a transmission, an input path disposed on an output side of the forward-reverse switching mechanism, and a motor connected to the input path.

8 Claims, 5 Drawing Sheets

(51) Int. Cl.
| | |
|---|---|
| *F16H 9/12* | (2006.01) |
| *B60W 20/10* | (2016.01) |
| *B60K 6/547* | (2007.10) |
| B60K 6/543 | (2007.10) |
| B60K 6/48 | (2007.10) |
| *F16H 3/66* | (2006.01) |
| *F16H 3/72* | (2006.01) |
| *B60K 1/02* | (2006.01) |

(52) U.S. Cl.
CPC ............... *F16H 9/12* (2013.01); *B60K 1/02* (2013.01); *B60K 6/543* (2013.01); *B60K 2006/4825* (2013.01); *B60Y 2200/92* (2013.01); *B60Y 2400/72* (2013.01); *F16H 3/663* (2013.01); *F16H 3/725* (2013.01); *F16H 3/728* (2013.01); *F16H 2037/026* (2013.01); *F16H 2200/2005* (2013.01); *F16H 2200/2023* (2013.01); *F16H 2200/2035* (2013.01)

(58) Field of Classification Search
CPC ...... H02K 7/116; H02K 7/006; H02K 21/024; H02K 7/12; H02K 21/14; B60L 50/16; B60L 15/2054
See application file for complete search history.

(56) References Cited

U.S. PATENT DOCUMENTS

| | | | |
|---|---|---|---|
| 2003/0162620 A1* | 8/2003 | Kmicikiewicz | B60W 10/10 475/211 |
| 2006/0247086 A1 | 11/2006 | Watanabe et al. | |
| 2010/0075800 A1 | 3/2010 | Suzuki et al. | |
| 2010/0087287 A1 | 4/2010 | Tabata et al. | |
| 2010/0279812 A1 | 11/2010 | Ha | |

FOREIGN PATENT DOCUMENTS

| | | | |
|---|---|---|---|
| JP | H11-107798 A | | 4/1999 |
| JP | 2003-120800 A | | 4/2003 |
| JP | 2006-264462 A | | 10/2006 |
| JP | 2006-280195 A | | 10/2006 |
| JP | 2006-327570 A | | 12/2006 |
| JP | 2008-185070 A | | 8/2008 |
| JP | 2011-509379 A | | 3/2011 |
| JP | 4660583 B2 | | 3/2011 |
| JP | 2011-093345 A | | 5/2011 |
| JP | 2013-016642 A | | 1/2013 |
| JP | 2015-031312 A | | 2/2015 |
| JP | 2015031312 A | * | 2/2015 |
| JP | 2015-067227 A | | 4/2015 |
| JP | 2015067227 A | * | 4/2015 |

OTHER PUBLICATIONS

Dec. 20, 2016 International Search Report issued in International Patent Application No. PCT/JP2016/080396.

Office Action of the corresponding Japanese Application No. 2016-183444, dated Feb. 12, 2020, 12 pages.

Office Action of the corresponding Chinese Application No. 201680060741.6, dated Jun. 29, 2020, 15 pp.

\* cited by examiner

HYBRID DRIVING APPARATUS

TECHNICAL FIELD

The present invention relates to a hybrid driving apparatus.

BACKGROUND ART

There has been proposed a method which adds a motor to a continuously variable transmission to constitute a hybrid driving apparatus in Patent Literature 1. According to this method, the motor is disposed on the side opposite to an engine with respect to pulleys of the continuously variable transmission, and disposed coaxially with a rotation shaft of the engine.

CITATION LIST

Patent Literature

PTL 1: JP 2013-16642 A

SUMMARY OF INVENTION

Technical Problem

According to the foregoing method, however, an entire length of the transmission increases by the axial length of a motor. This method is therefore difficult to apply to a compact vehicle.

Accordingly, an object of the present invention is to solve the aforementioned issues by providing a hybrid driving apparatus capable of constituting a hybrid system even in a limited space without increasing a full length of a transmission.

Solution to Problem

In accomplishing these and other objects, according to an aspect of the present invention, there is provided a hybrid driving apparatus comprising:

a forward-reverse switching mechanism;

a transmission;

an input path disposed on an output side of the forward-reverse switching mechanism; and a motor connected to the input path.

Advantageous Effects of Invention

According to the above aspect of the present invention, the input path is provided to allow input of motor output to the output side of the forward-reverse switching mechanism in a vehicle equipped with an automatic transmission of a type which positions the forward-reverse switching mechanism on the upstream side of the transmission. Accordingly, a hybrid function is achievable by a small range of remodeling, and fuel consumption of the vehicle can improve.

BRIEF DESCRIPTION OF DRAWINGS

These and other objects and features of the present invention will become apparent in the light of following description relating to preferred embodiments describing the accompanying drawings. In the drawings.

DESCRIPTION OF EMBODIMENTS

Embodiments according to the present invention are hereinafter described in detail with reference to the drawings.

First Embodiment

A hybrid driving apparatus 620 according to a first embodiment of the present invention is incorporated in a vehicle equipped with an automatic transmission of a type which positions a forward-reverse switching mechanism on the upstream side of a transmission. The hybrid driving apparatus 620 allows input of motor output to an output side of the forward-reverse switching mechanism to thereby provide a hybrid function by a small range of remodeling and improve fuel consumption of the vehicle.

Figure 1:
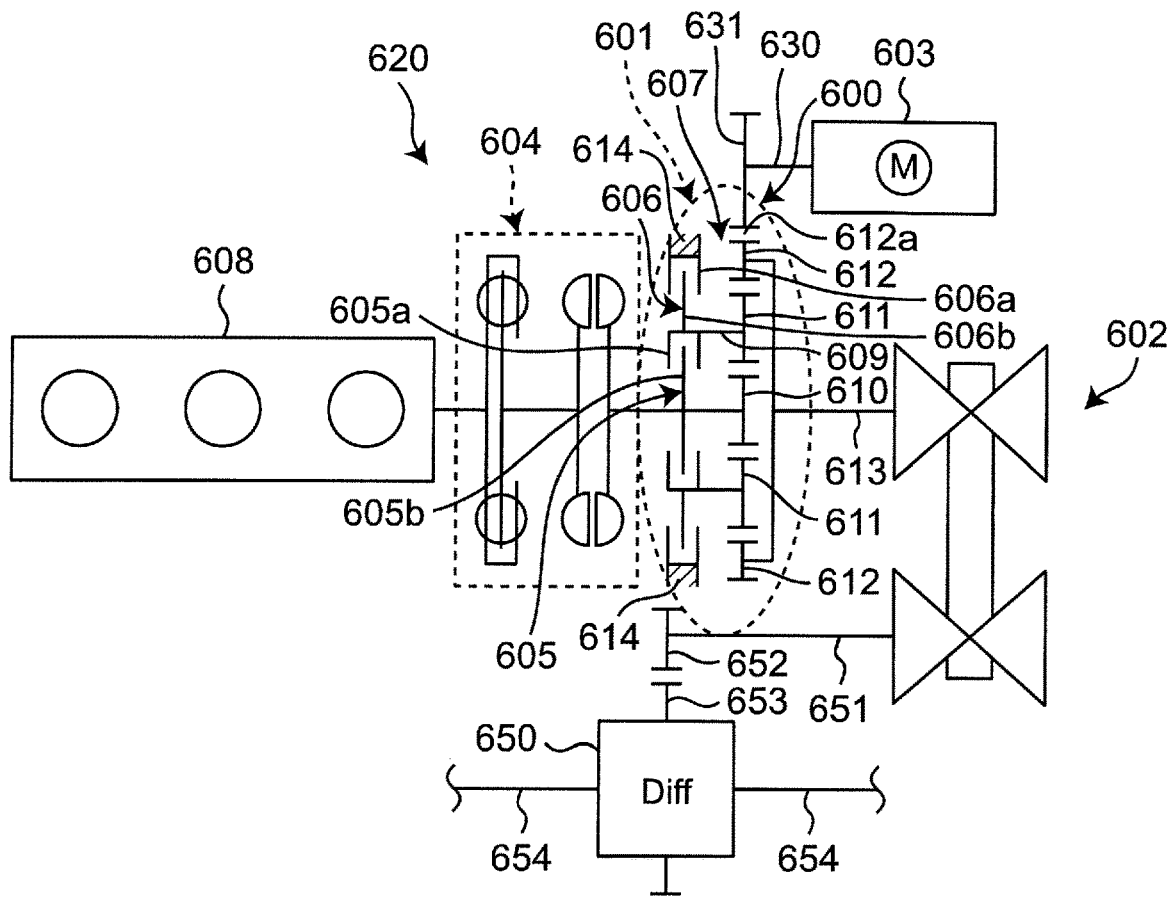
FIG. 1 is a schematic configuration view of a driving apparatus for vehicle according to a first embodiment of the present invention.
Figure 2:
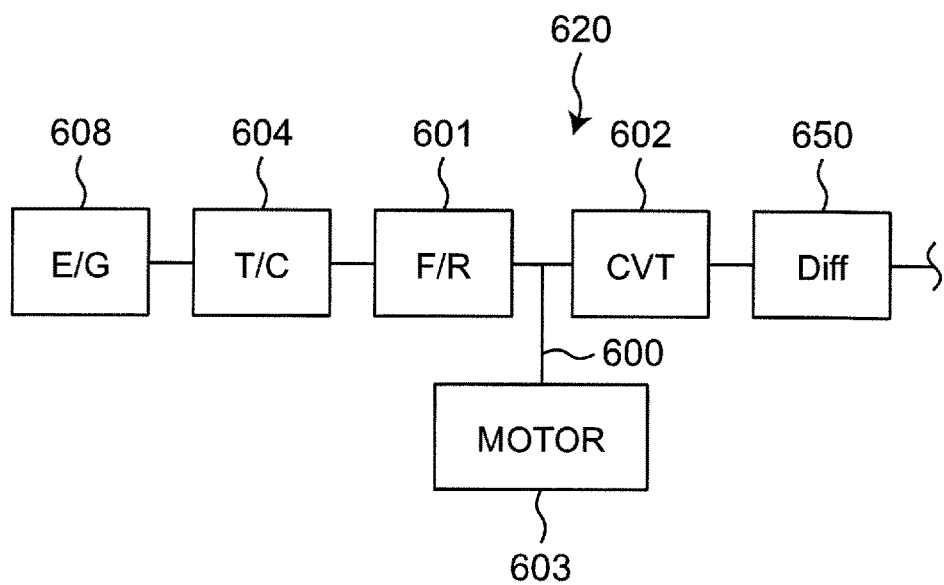
FIG. 2 is a power path block diagram of the driving apparatus for vehicle according to the first embodiment.

As illustrated in FIGS. 1 and 2, the hybrid driving apparatus 620 according to the first embodiment is disposed on the downstream side of a starting device (T/C, i.e., torque converter or the like) 604 disposed on the downstream side of an engine (E/G) 608, for example. The hybrid driving apparatus 620 includes a forward-reverse switching mechanism (F/R) 601, a transmission (e.g., CVT) 602, an input path 600 on the output side of the forward-reverse switching mechanism 601, and a motor 603 connected to the input path 600. For example, the transmission 602 is constituted by a CVT.

The forward-reverse switching mechanism 601 includes a friction clutch 605, a friction brake 606, and a planetary gear 607. The friction clutch 605 includes an input side member 605b connected to an output shaft of the starting device 604, and an output side member 605a coming into contact with and separating from the input side member 605b. The friction brake 606 includes an input side member 606b connected to the output side member 605a of the friction clutch 605, and an output side member 606a coming into contact with and separating from the input side member 606b.

The planetary gear 607 includes a sun gear 610, a plurality of pinion gears 611 engaging with the sun gear 610, and a ring gear 612 engaging with the pinion gears 611. The output side member 605a of the friction clutch 605 is connected to a pinion carrier 609 of the plurality of pinion gears 611.

Input from an engine (E/G) 608 is inputted to the sun gear 610 of the planetary gear 607 via a starting device (e.g., T/C as torque converter) 604. For example, the starting device 604 is a torque converter.

The input side member 605b of the friction clutch 605 is connected to the sun gear 610, while the output side member 605a of the friction clutch 605 is connected to the pinion gears 611 via the pinion carrier 609.

The input side member 606b of the friction brake 606 is connected to the pinion carrier 609, while the output side member 606a of the friction brake 606 is fixed to a case 614 of the hybrid driving apparatus 620.

The ring gear 612 is connected to an input shaft 613 of the transmission 602.

A gear 612a is provided on an outer circumferential surface of the ring gear 612 to form the input path 600. More specifically, the gear 612a on the outer circumferential surface of the ring gear 612 engages with a gear 631 fixed to the output shaft 630 of the motor 603. Torque of the motor 603 is inputted to the ring gear 612 corresponding to the output side of the forward-reverse switching mechanism 601.

Note that a gear 652 is fixed to an output shaft 651 extended from the transmission 602 in FIG. 1. The gear 652 engages with a gear 653 of a differential (Diff) 650. A pair of drive shafts 654 are connected to the differential 650.

According to the first embodiment, the input path 600 is provided to allow input of motor output to the output side of the forward-reverse switching mechanism 601 in a vehicle equipped with an automatic transmission of a type which positions the forward-reverse switching mechanism 601 on the upstream side of the transmission 602. Accordingly, a hybrid function is achievable by a small range of remodeling, and traveling performance and fuel consumption of the vehicle can improve. More specifically, use of the motor 603 as auxiliary power in addition to engine power can reduce engine output. Moreover, the ring gear 612 has the outer teeth 612a, while the motor 603 has a different axis for input. Accordingly, electrification of the vehicle is realizable without the necessity of a considerable change of an internal structure of an existing transmission. Furthermore, torque from the motor 603 is inputted to the input side of the transmission 602. In this case, the motor 603 can expand an operation range by utilizing a transmission gear ratio of the transmission 602. Accordingly, fuel consumption of the vehicle can improve. In addition, the clutch 605 and the brake 606 of the forward-reverse switching mechanism 601 can be opened to cut off output from the engine 608 at the time of deceleration of the vehicle. Accordingly, a regeneration energy quantity can be raised by eliminating engine friction losses.

Figure 3:
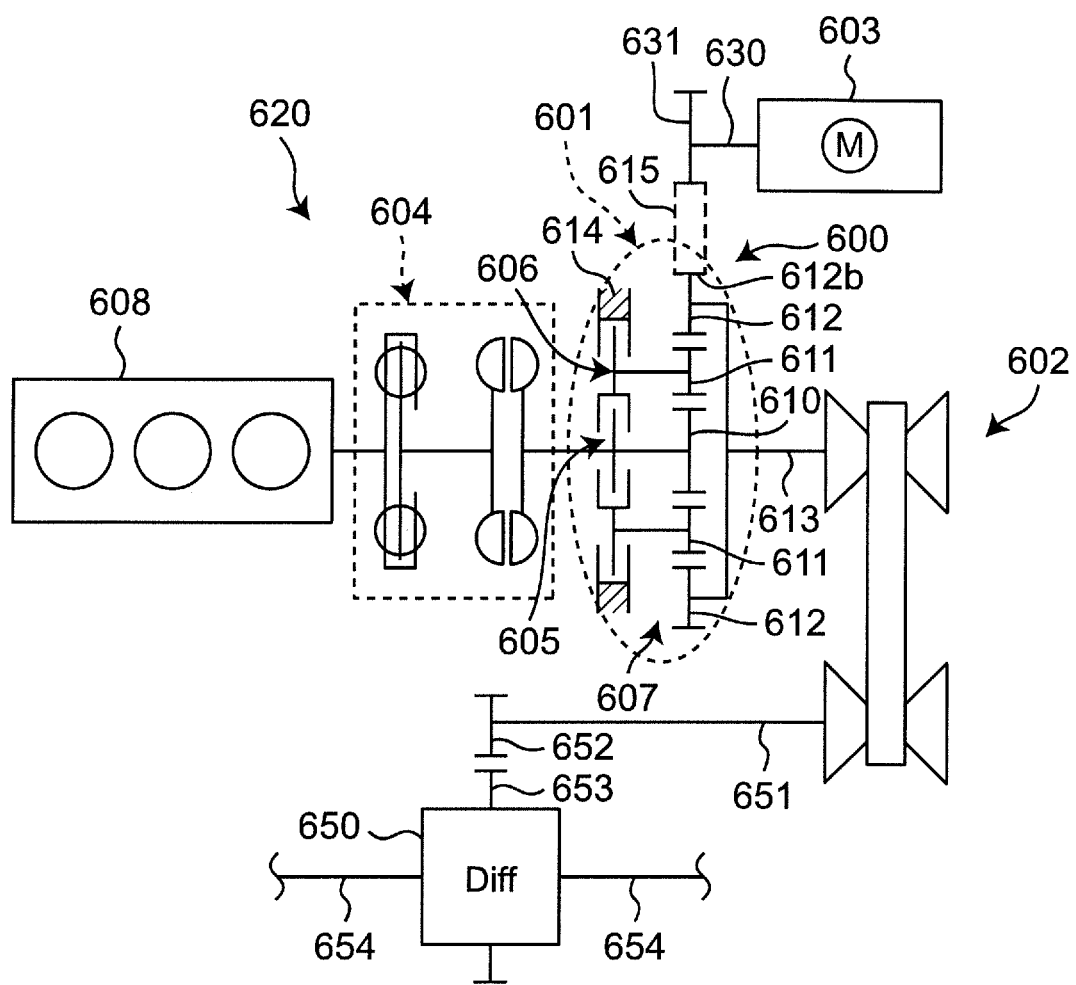
FIG. 3 is a schematic configuration view of a driving apparatus for vehicle according to a first modified example of the first embodiment of the present invention.

In a first modified example of the first embodiment, as illustrated in FIG. 3, the outer circumferential surface of the ring gear 612 of the input path 600 of the forward-reverse switching mechanism 601 may be a sprocket 612b instead of the gear 612a. The sprocket 612b may be connected to the output shaft 630 of the motor 603 via a chain 615. The chain 615 thus interposed can increase a degree of freedom of positioning of the motor. For example, a center distance of the gear transmission adopted in the first embodiment is determined in accordance with a reduction gear ratio. Accordingly, limitations may be imposed on a radial dimension of the motor. However, the chain interposed as above produces a degree of freedom for the center distance, thereby eliminating the possibility of the limitations.

Figure 4:
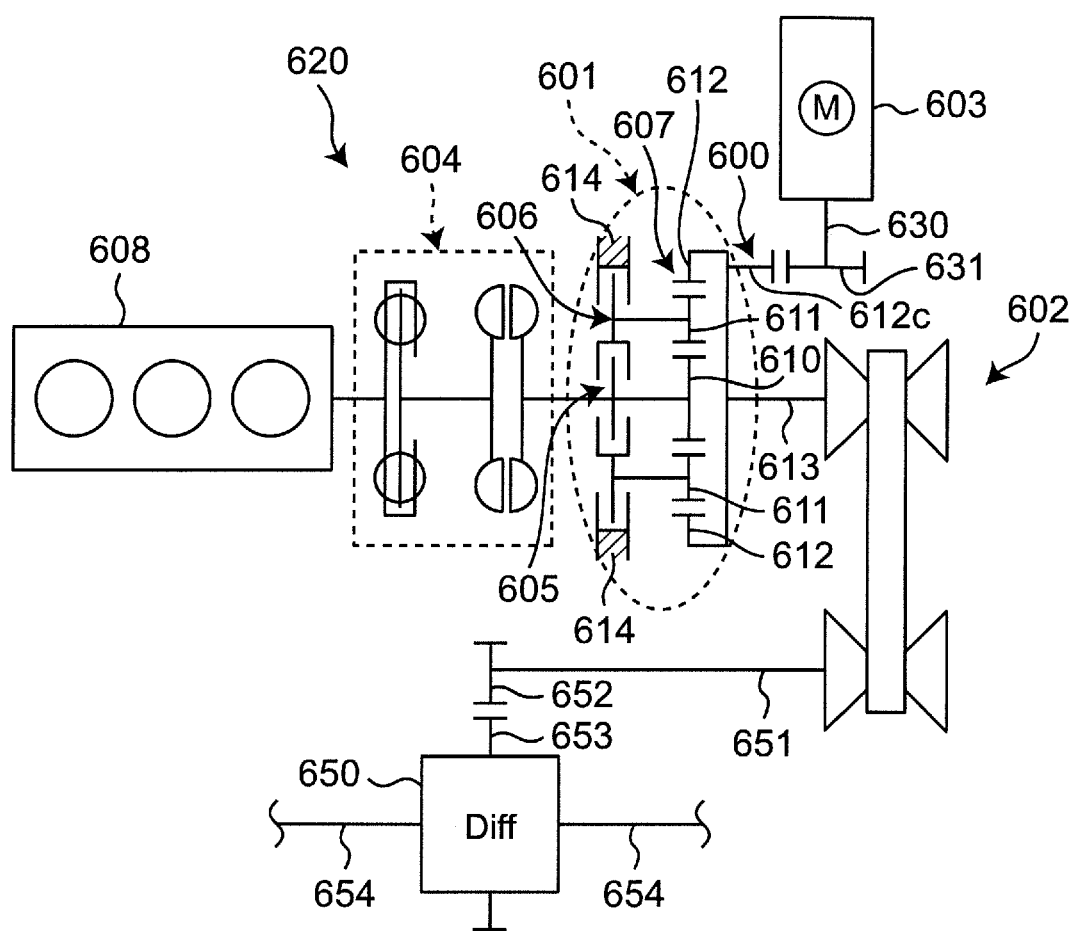
FIG. 4 is a schematic configuration view of a driving apparatus for vehicle according to a second modified example of the first embodiment of the present invention.
Figure 5:
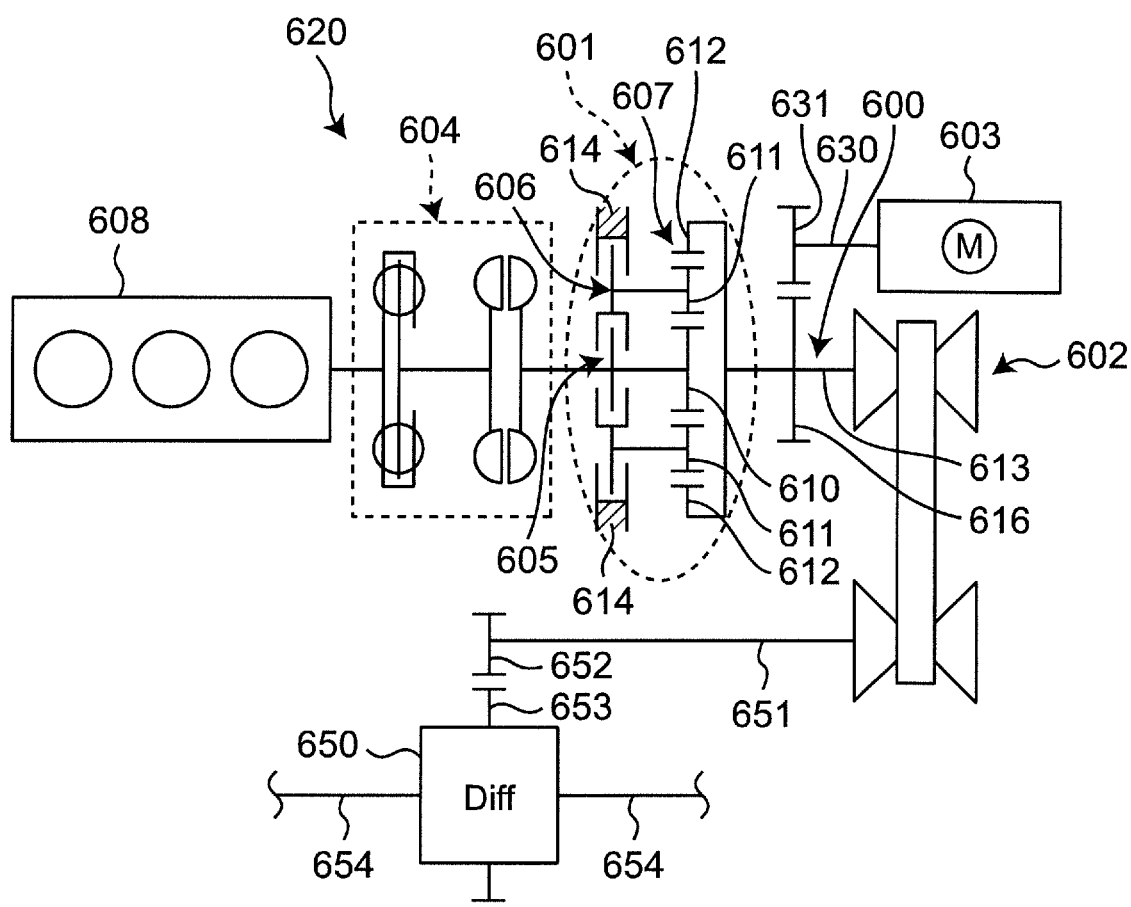
FIG. 5 is a schematic configuration view of a driving apparatus for vehicle according to a third modified example of the first embodiment of the present invention.
Figure 6:
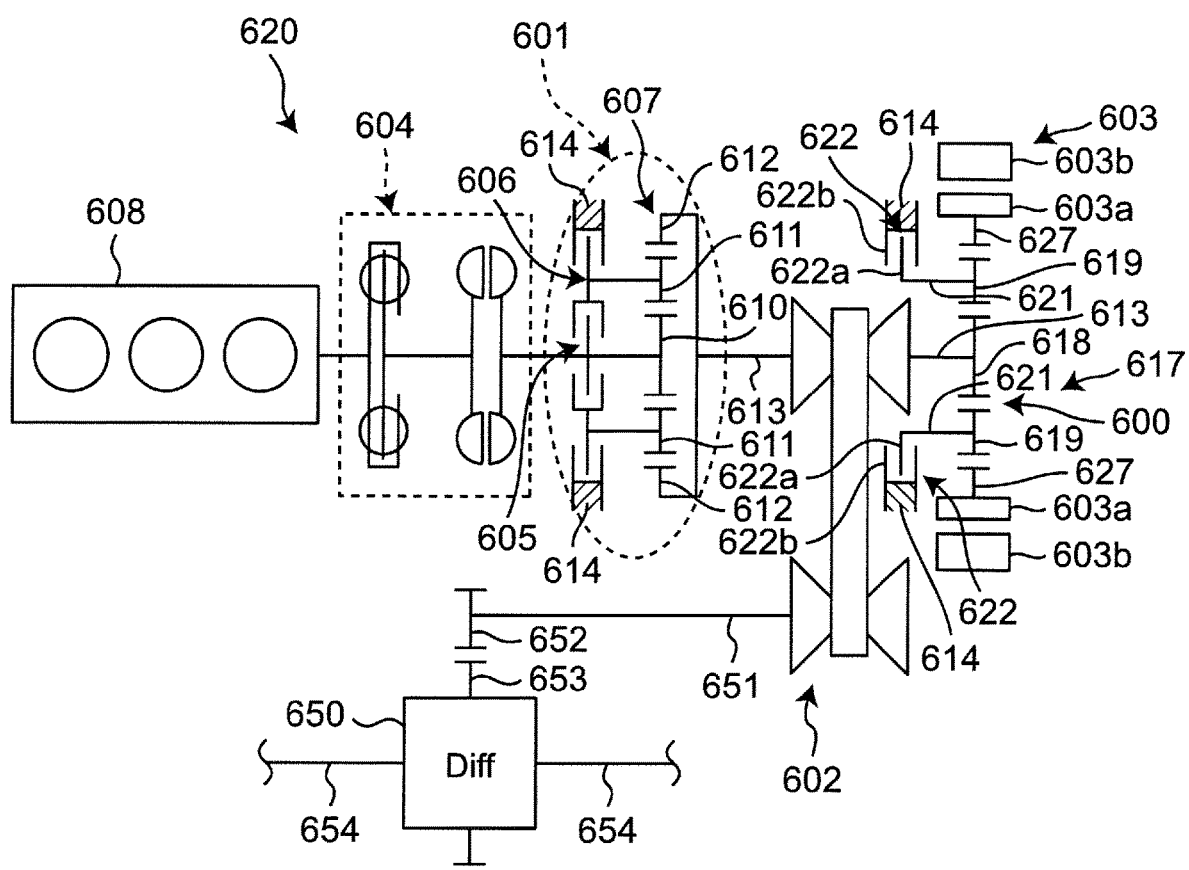
FIG. 6 is a schematic configuration view of a driving apparatus for vehicle according to a fourth modified example of the first embodiment of the present invention.

Moreover, in second to fourth modified examples, as illustrated in FIGS. 4 to 6, the input path 600 of the forward-reverse switching mechanism 601 may be disposed on a side surface of the ring gear 612, or on the input shaft 613 of the transmission 602.

More specifically, a gear 612c provided on the side surface of the ring gear 612 in FIG. 4 engages with a gear 631 fixed to the output shaft 630 of the motor 603. Torque of the motor 603 is inputted to the ring gear 612 corresponding to the output side of the forward-reverse switching mechanism 601. According to this configuration, the degree of freedom for positioning of the motor increases similarly to the first modified example. Accordingly, limitations to the radial dimension of the motor can be eliminated.

In FIG. 5, a gear 616 is fixed to the input shaft 613 of the transmission 602. The gear 616 engages with the gear 631 fixed to the output shaft 630 of the motor 603. Torque of the motor 603 is inputted to the input shaft 613 of the transmission 602. According to the first embodiment, the radial dimension of the ring gear 612 imposes limitations to the number of teeth of the gear 612a, i.e., the reduction gear ratio of the output shaft 630 of the motor 603 to the input shaft 613. However, the configuration in this modified example eliminates limitations imposed by the radial dimension of the ring gear 612 in determining the reduction gear ratio of the motor 603 to the input shaft 613.

In FIG. 6, a supplementary planetary gear 617 is fixed to the input shaft 613 of the transmission 602. The motor 603 is incorporated in the supplementary planetary gear 617. Torque of the motor 603 is inputted to the ring gear 612 corresponding to the output side of the forward-reverse switching mechanism 601. The supplementary planetary gear 617 includes a sun gear 618, a plurality of pinion gears 619 engaging with the sun gear 618, and a ring gear 627 engaging with the pinion gears 619. An input side member 622a of a friction brake 622 is connected to a pinion carrier 621 of the plurality of pinion gears 619. The input side member 622a of the friction brake 622 is connected to the pinion carrier 621, while the output side member 622b of the friction brake 622 is fixed to the case 614 of the hybrid driving apparatus 620. A rotor 603a of the motor 603 is fixed to an outer circumferential surface of the ring gear 627. The rotor 603a rotates relative to a stator 603b to constitute the motor 603. According to this configuration, the supplementary planetary gear 617 added between the motor 603 and the transmission 602 increases the rotation speed of the motor 603, and reduces the size of the motor 603. In such a situation where the motor 603 is unnecessary during traveling, the friction brake 622 of the pinion carrier 621 may be opened to stop rotation of the motor 603 and eliminate losses produced by motor rotation.

By properly combining the arbitrary embodiment(s) or modified example(s) of the aforementioned various embodiments and modified example(s), the effects possessed by the embodiment(s) or modified example(s) can be produced. Moreover, combinations of the embodiments, combinations of the working examples, and combinations of the embodiment(s) and the working example(s) may be made. Furthermore, combinations of the features included in the different embodiments or working examples may be made.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

A hybrid driving apparatus according to the present invention is capable of constituting a hybrid system even in a limited space, and is useful when applied to various types of vehicle such as a compact automobile.

REFERENCE SIGNS LIST 600. input path
601. forward-reverse switching mechanism (F/R)
602. transmission (e.g., CVT)
603. motor
603a. rotor
603b. stator
604. starting device
605. friction clutch
605a. output side member of friction clutch
605b. input side member of friction clutch
606. friction brake
606a. output side member of friction brake
606b. input side member of friction brake
607. planetary gear
608. engine (E/G)
609. pinion carrier
610. sun gear
611. pinion gear
612. ring gear
612a. gear
612b. sprocket
612c. gear
613. input shaft
614. case of hybrid driving apparatus
615. chain
616. gear
617. supplementary planetary gear
618. sun gear
619. pinion gear
621. pinion carrier
622. friction brake
622a. output side member of friction brake
622b. input side member of friction brake
620. hybrid driving apparatus
627. ring gear
630. output shaft
650. differential (Diff)
651. output shaft
652. gear
653. gear
654. drive shaft

The invention claimed is:

1. A hybrid driving apparatus comprising:
a forward-reverse switching mechanism including a friction clutch, a friction brake, a planetary gear, and an input path disposed on an output side of the forward-reverse switching mechanism;
a transmission; and
a motor directly connected to the input path of the forward-reverse switching mechanism,
the planetary gear including a sun gear, a pinion gear that engages with the sun gear, and a ring gear that engages with the pinion gear,
the input path of the forward-reverse switching mechanism being disposed on the ring gear, and
the ring gear being directly connected to an input shaft of the transmission.

2. The hybrid driving apparatus according to claim 1, wherein
engine input is inputted to the sun gear of the planetary gear via a starting device,
the friction clutch is connected to the sun gear and the pinion gear, and
the friction brake is connected to a pinion carrier.

3. The hybrid driving apparatus according to claim 2, wherein
the starting device is a torque converter.

4. The hybrid driving apparatus according to claim 1, wherein
a gear is provided on an outer circumferential surface of the ring gear of the planetary gear to form the input path.

5. The hybrid driving apparatus according to claim 4, wherein
an output shaft of the motor has a gear that engages with the gear on the outer circumferential surface of the ring gear.

6. The hybrid driving apparatus according to claim 1, wherein
an output shaft of the motor has a chain that engages with a sprocket formed on an outer circumferential surface of the ring gear.

7. The hybrid driving apparatus according to claim 1, wherein
the input path is disposed on a side surface of the ring gear.

8. A hybrid driving apparatus comprising:
a forward-reverse switching mechanism;
a transmission;
an input path disposed on an output side of the forward-reverse switching mechanism; and
a motor connected to the input path, wherein
the input path is disposed on an input shaft of the transmission,
a supplementary gear and a friction brake are disposed between the input path and the motor,
the supplementary planetary gear includes a sun gear, a pinion gear that engages with the sun gear, and a ring gear that engages with the pinion gear,
motor input is inputted to the ring gear of the supplementary planetary gear,
the friction brake is connected to a pinion carrier, and
the sun gear is connected to the input shaft of the transmission.

* * * * *